United States Patent [19]

Stetson

[11] 4,282,557

[45] Aug. 4, 1981

[54] SURGE VOLTAGE ARRESTER HOUSING HAVING A FRAGIBLE SECTION

[75] Inventor: Earl W. Stetson, Pittsfield, Mass.

[73] Assignee: General Electric Company

[21] Appl. No.: 89,149

[22] Filed: Oct. 29, 1979

[51] Int. Cl.[3] .................... H02H 3/22

[52] U.S. Cl. .................... 361/117; 361/125; 361/128

[58] Field of Search .................... 361/117, 124, 125, 126, 361/127, 128; 313/220; 337/327, 328, 28, 30, 31, 34

[56] References Cited

U.S. PATENT DOCUMENTS

| | | | |
|---|---|---|---|
| 2,263,620 | 11/1941 | Earle | 361/128 |
| 2,721,958 | 10/1955 | Pidoux | 361/128 X |
| 3,218,517 | 11/1965 | Sankey | 361/128 X |
| 3,869,650 | 3/1975 | Cunningham et al. | 361/117 |

FOREIGN PATENT DOCUMENTS

| | | | |
|---|---|---|---|
| 1513484 | 11/1969 | Fed. Rep. of Germany | 361/117 |

*Primary Examiner*—J. D. Miller
*Assistant Examiner*—Reinhard J. Eisenzopf
*Attorney, Agent, or Firm*—Richard A. Menelly

[57] ABSTRACT

Surge voltage arresters are provided with a frangible housing to cause the housing to break at a predetermined section into a relatively few pieces upon varistor failure. The breaking of the housing deters excessive pressure buildup within the arrester.

7 Claims, 6 Drawing Figures

SURGE VOLTAGE ARRESTER HOUSING HAVING A FRAGIBLE SECTION

BACKGROUND OF THE INVENTION

Surge arresters of the type containing zinc oxide varistors and series gaps within an insulating housing or closure are currently available for mounting both in the vicinity of distribution transformers to protect the distribution transformers from voltage surges, and on riser poles in the vicinity of underground electrical substations, to protect the substation equipment from voltage surges.

Since zinc oxide varistors are currently being used in place of silicon carbide varistors in distribution arrester applications, some means must be provided to prevent the arrester housing from catastrophically rupturing upon varistor failure. When silicon carbide varistors are used within polemounted distribution protection applications, a gas-pressure release outlet can be provided in order to expel the hot ionized gases generated to the exterior of the arrester housing forming an external arc which causes the housing to fracture into a relatively few pieces.

Distribution arresters are employed on voltage distribution systems to protect the electrical equipment from overvoltage surges. Although the failure of distribution surge arresters is infrequent, it is possible that such failure can result in gas pressure buildup within the arrester housing. Subsequent rupture of the housing can cause damage to adjacent electrical equipment and personnel. The purpose of this invention is to provide an improved arrester that will rupture in a predetermined manner at lower internal pressures than previous designs to reduce the danger to equipment and personnel.

SUMMARY OF THE INVENTION

An arrester housing is provided with a frangible section structured to cause the housing to break at a predetermined section upon the occurrence of gas-pressure buildup within the housing. Embodiments of the arrester housing include a housing having a predetermined section that is thinner than the remainder of the arrester housing as well as housings which are cut into two separate portions and re-cemented into a unitary structure.

A further embodiment comprises an arrester assembly wherein the arrester is mounted in such a manner that the frangible section of the arrester housing is proximate a grounded mounting clamp to facilitate striking of an arc to the grounded clamp.

DESCRIPTION OF THE PREFERRED EMBODIMENT

Figure 1:
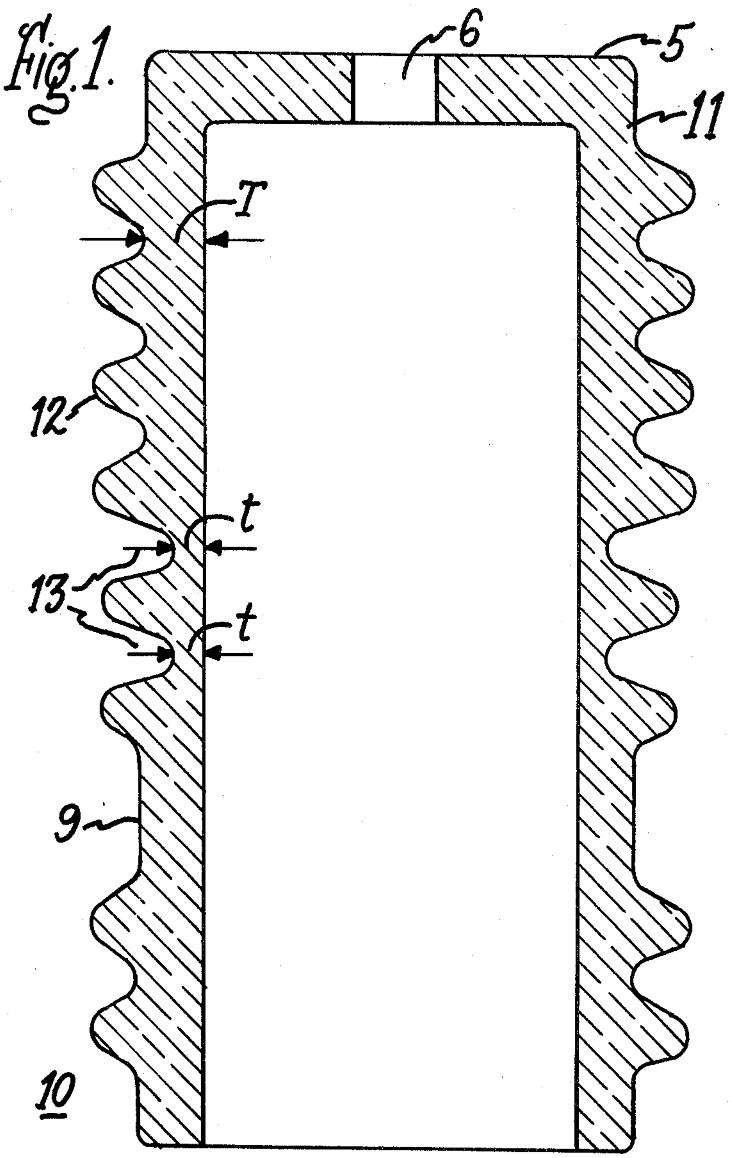
FIG. 1 is a side sectional view of one embodiment of the frangible arrester housing of the invention.

FIG. 1 shows a lightning arrester housing 10 made of a suitable insulating material such as porcelain, plastic, hard rubber or glass. Housing 10 contains a portion 11 which includes a plurality of skirts 12 in order to provide voltage creep along the outsides of the housing. Hole 6 is provided at the top of the housing to accommodate a top mounting electrode and the housing is open at the bottom. A flat section 9 is provided near the bottom of the housing to facilitate mounting the arrester to a distribution pole. In order to provide a predetermined breakpoint within the housing wall, a pair of frangible sections 13 is provided by making the thickness t of wall 11 between the two skirts 12 immediately adjacent flat portion 9 thinner than any where else along the housing. The thickness t of housing wall 11 indicated at one of the frangible sections 13 is less than half the thickness T of the remainder of wall 11. This is to insure that when a varistor failure occurs within housing 10, causing gas pressure to build up within the housing, the housing will break preferentially along frangible sections 13 before the pressure builds up to such an extent that the housing totally ruptures. Although frangible sections 13 are located proximate flat portion 9, the frangible sections can be located at any predetermined location on the arrester housing. Frangible sections 13 are preferentially located proximate flat portion 9 in order to cause the hot ionized gases, which rapidly build up within the arrester housing upon the occurrence of a varistor failure, to vent to the atmosphere when frangible section 13 becomes ruptured.

Figure 2:
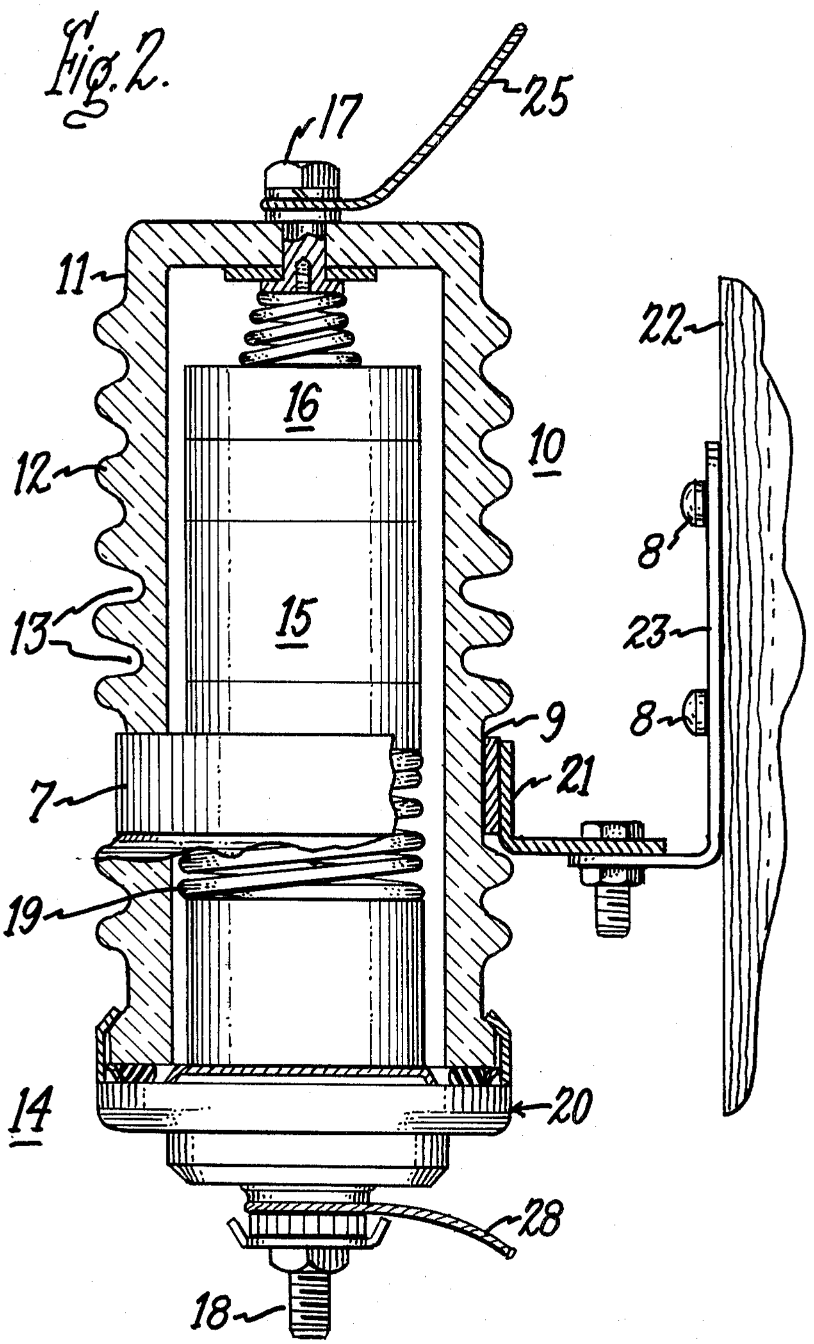
FIG. 2 is a front sectioned view of a polemounted arrester utilizing the frangible arrester housing of FIG. 1.
Figure 3:
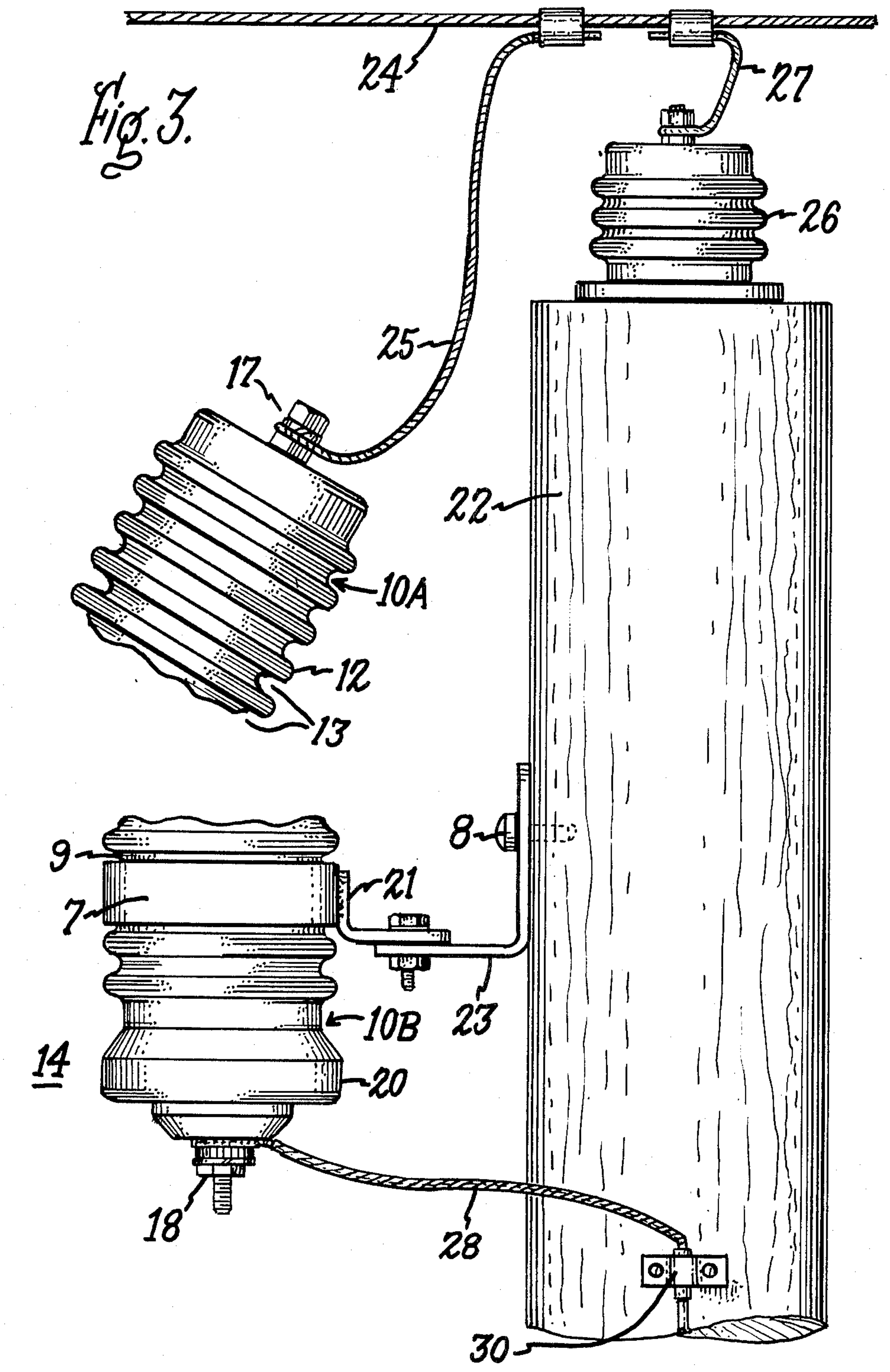
FIG. 3 is a side perspective view of an arrester according to the invention after becoming fractured upon the occurrence of a varistor failure.

A voltage surge arrester 14 containing frangible sections 13 is shown in FIGS. 2 and 3. A plurality of varistors 15 and gap assemblies 16 are contained within arrester 14 and electrical contact with the varistors is made by means of a top electrode connection 17 and a bottom electrode connection 18. Spring 19 assures good electrical contact between the bottom of varistors 15 and disconnect unit 20. Disconnect 20 is of the type specifically employed with zinc oxide varistors and described within U.S. Patent Application Ser. No. 39,825 filed May 17, 1979, now abandoned, which Application is incorporated herein for purposes of reference. A mounting bracket 21 and clamp 7 encompassing housing 10 is fixedly attached to pole 22 by means of hanger 23 and bolts 8. In operation top electrode connection 17 is attached to line 24 by means of lead 25 and bottom electrode connection 18 is connected with ground.

Upon the occurrence of an arrester failure and subsequent buildup of pressure exerted by the hot ionized gases, housing 10 ruptures at frangible section 13 and vents the gases to the atmosphere. In most applications, hanger 23 is connected to ground potential and in such cases the vented gases immediately strike this hanger to form a short circuit from the line potential of lead 25 to ground eliminating the bottom section of housing 10 from the arc path.

FIG. 3 shows arrester 14 immediately after fracture wherein arrester housing 10 becomes separated into top and bottom portions, 10A, 10B, the bottom portion 10B is retained by means of clamp 7, bracket 21 and hanger 23 which is fixedly held to pole 22 by means of bolts 8. The top housing portion 10A of arrester 14 is held by means of line lead 25 connecting between top electrode connection 17 and line 24. Line 24 is supported by means of an electrical insulator 26 attached to pole 22 at one end and at an opposite end to line 24 by means of connector 27. Bottom electrode connection 18 connects with arrester 14 through disconnect 20 and is grounded by means of ground lead 28 fixedly attached to a pole 22 by means of bracket 30. It can be seen from FIG. 3 that clamp 7 extending around flat portion 9 of housing 10 serves to hold the bottom housing portion 10B of arrester 14 after the arrester becomes fractured along at least one of the predetermined frangible sections 13 of the invention.

Housing 10 described within the embodiments of FIGS. 1–3 is fabricated from a porcelain material but this is for purposes of description only. Other electrically insulating materials which can provide a preferential frangible section, such as glass, hard rubber and plastic can also be employed. A reinforced fiber glass housing having a predetermined frangible section can operate in a similar manner as described for porcelain.

Figure 4B:
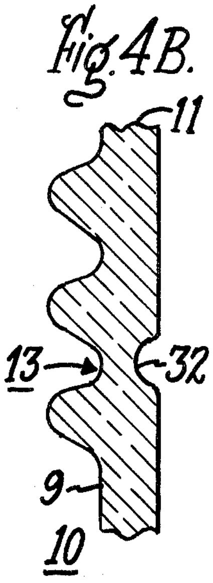
FIGS. 4A–4C show different embodiments of the frangible section of the arrester housing in accordance with the invention.
Figure 4C:
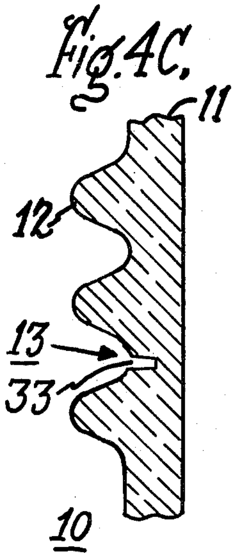
Figure 4A:
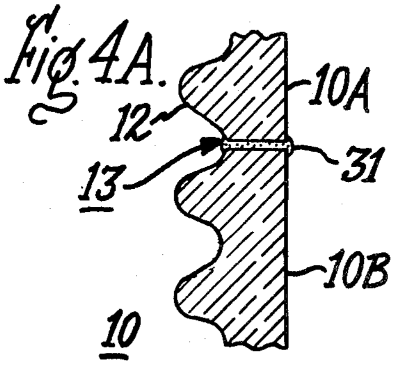

FIG. 4A shows another frangible section 13 on wall 11 of arrester housing 10. In this embodiment, a portion of wall 11 between a pair of skirts 12 is cut completely through to divide the housing into two sections 10A and 10B. The two sections are then rejoined by means of a cement 31 which can comprise a glass frit or a porcelain glaze. Frangible section 13, consisting of the rejoined housing portions 10A, 10B breaks preferentially relative to the remaining wall 11. In place of a layer of porcelain cement 31 a different type of cementatious material can be employed. When an epoxy, other plastic, glass or a silicone based meltable cement is used to rejoin the separate portions 10A, 10B the properties of the adhesive provides an added benefit. The temperature rapidly builds up within arrester 14, upon varistor failure, and causes the wall portions to become separated when the gas pressure builds up to a predetermined amount. The physical properties of the cement can be tailored to cause the break to occur at any desired pressure.

The embodiment depicted in FIG. 4B comprises an inner groove 32 formed on wall 11 between a pair of skirts 12 on housing 10. The frangible section 13 comprises the section of reduced thickness of wall 11 resulting from the inner groove opposite the region between the pair of skirts.

The embodiment depicted in FIG. 4C comprises a thin cut or slice 33 between a pair of skirts 12 on wall 11 of housing 10. Frangible section 13, provided by cut or slice 33 behaves in a manner similar to that of the embodiment depicted in FIGS. 4A and 4B.

Although the embodiments depicted herein describe the frangible section as completely circumscribing the arrester housing, this is by way of example only. The frangible section can extend only partially along the housing circumference when it is preferred for example to have the housing break in a particular direction relative to the grounded support clamp.

Other methods for forming the frangible section of the housing include indenting the housing top 5 or by cementing housing top 5 to housing 10. These methods provide pressure relief, but do not provide for the advantage of the electric arc transfer to ground as the earlier embodiments.

Although the frangible section housings of the invention are described relative to pole mounted distribution arresters, this is by way of example only. The arrester of the invention finds application whereever surge arresters may be exployed.

What I claim as new and desire to secure by Letters Patent of the United States:

1. A voltage surge arrester housing comprising:

an electrically insulating closure open at least at one end and having a first wall thickness for providing break resistant properties to the housing; and at least one frangible wall section for providing a preferred breaking portion to said housing, said frangible wall section comprising a first separate portion and a second separate portion of said closure cemented together to form a joint.

2. The housing of claim 1 wherein said two separate portions are cemented together with a material having a lower melting temperature than said insulating closure.

3. The housing of claim 2 wherein said cement is selected from the group consisting of plastic, glass, silicone and rubber.

4. A surge voltage arrester comprising:

an insulating housing having a frangible section on at least part of its circumference and means for providing a ground connection and a line connection to said housing; and at least one varistor within said housing for providing electrical connection between said line and said ground upon the occasion of a surge voltage condition, said frangible section comprising at least two separate portions of said housing cemented together to form a jointed portion to said housing.

5. The arrester of claim 4 wherein said cement comprises a porcelain or glass having a melting temperature approximately the same as the melting temperature of said housing.

6. The arrester of claim 4 wherein said cement has a melting temperature lower than the melting temperature of said housing.

7. The arrester of claim 6 wherein said cement is selected from the group consisting of a plastic, glass, silicone, and rubber.

* * * * *